United States Patent [19]

Martin

[11] 4,108,019
[45] Aug. 22, 1978

[54] SOLAR TRACKING DEVICE

[76] Inventor: Roger J. Martin, 1 Annesley Ave., Toronto, Ontario, Canada, M4G 2T5

[21] Appl. No.: 798,547

[22] Filed: May 19, 1977

[51] Int. Cl.² .................... F16H 21/40; F16H 21/52; F24J 3/02
[52] U.S. Cl. ........................................ 74/469; 74/25; 74/63; 126/270
[58] Field of Search .................. 74/25, 63, 469; 126/270, 271; 343/765, 766; 350/292, 299

[56] References Cited
U.S. PATENT DOCUMENTS

| | | | |
|---|---|---|---|
| 3,253,473 | 5/1966 | Chisholm | 74/469 X |
| 3,996,917 | 12/1976 | Trihey | 126/270 |
| 4,038,971 | 8/1977 | Bezborodko | 126/270 X |
| 4,038,972 | 8/1977 | Orrison | 126/270 X |
| 4,044,752 | 8/1977 | Barak | 126/270 |

Primary Examiner—Allan D. Hermann
Attorney, Agent, or Firm—Dowell & Dowell

[57] ABSTRACT

A solar tracking device constructed in accordance with the present invention includes an azimuthal drive mechanism which utilizes the variable angular velocity of the driven member of a universal joint as the source of power for driving a carriage about a fixed axis at a variable angular velocity corresponding to the variable angular velocity of the sun about the fixed axis. The driving element of the universal joint is mounted on a driving shaft which extends parallel to the axis of rotation of the earth. The altitude control mechanism includes a driving element mounted on the driving shaft which rotates about an axis parallel to the axis of rotation of the earth. The driving element rotates in an equitorial plane whereby its angle of inclination varies in accordance with the variation in altitude of the sun as it rotates in azimuth. A transmission system is provided for connecting the driving element to a tracking head to rotate the tracking head about an axis to track the sun in altitude as the tracking head is driven about the fixed axis in azimuth.

4 Claims, 11 Drawing Figures

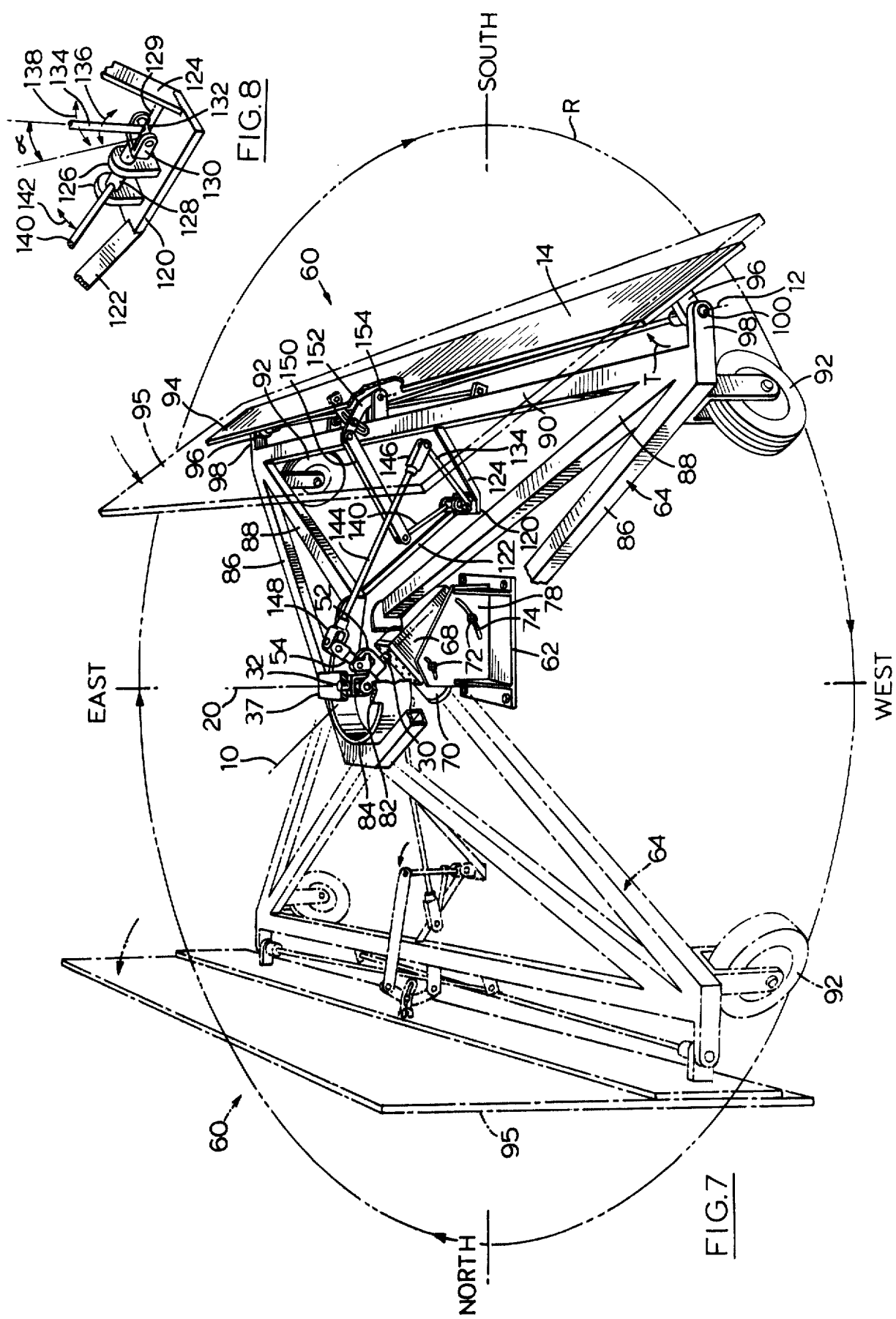

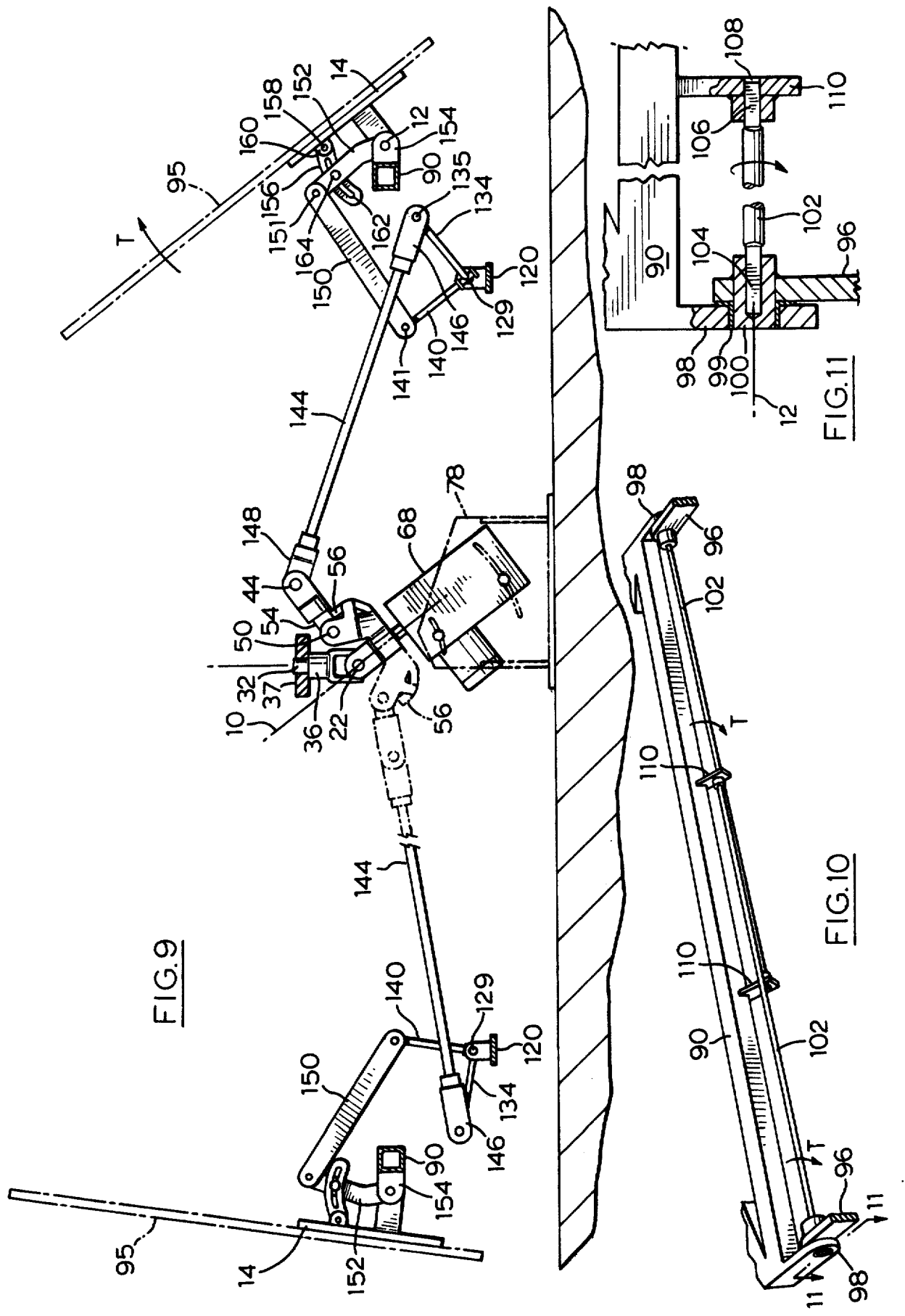

SOLAR TRACKING DEVICE

This invention relates to a solar tracking device. In particular, this invention relates to a solar tracking device suitable for maintaining the alignment of solar energy collector plates with the sun as the earth rotates.

Various systems for tracking the sun as the earth rotates have previously been proposed. However, the drive mechanisms have been complex and expensive to manufacture and maintain. With the increased interest in solar energy and the likelihood of solar energy being widely used, both commercially and domestically, a simple form of tracking device would serve to make these devices more practical for general use.

The apparent rotation of the sun about the earth as observed from a point on the surface of the earth which is spaced from the equitorial and polar regions of the earth is such that the position of the sun varies both in azimuth and in altitude so that the drive mechanism must accommodate variations in two distinct planes. Previous proposals have included an electronic control mechanism for controlling the rotational speed of the tracking device in azimuth and in altitude. Such devices would, however, be expensive to manufacture and would require highly skilled maintenance mechanics in order to service them.

The present invention provides a simple mechanical drive mechanism which serves to track the sun in azimuth and in altitude.

I have recognized that the azimuthal rotation of the sun about a point on the surface of the earth has an analog in the relationship of the angular rotation of the driven member with respect to the driving member of a common universal joint or Hookes joint.

The sun may be observed to rotate about a point on the surface of the earth in an equitorial plane extending from an axis extending parallel to the axis of rotation of the earth. I have recognized that by mounting the tracking head so that it rotates in altitude about an axis which is disposed in the first plane which intersects the axis of rotation of the earth at its point of intersection with the equitorial plane, the variation in angular inclination of a radiant extending from the first axis in the equitorial plane with respect to the first plane in the analog of the variation in altitude of the sun with respect to the first plane. By mounting an altitude drive member for rotation in the equitorial plane about the axis of rotation parallel to the axis of the earth, I can provide an altitude drive mechanism which will track the movement of the sun in altitude.

SUMMARY OF INVENTION

According to one aspect of the present invention, the solar tracking device comprises a driving shaft having a first axis extending longitudinally thereof about which it is rotationally driven at a constant speed, said driving shaft being mounted with said first axis extending parallel to the axis of rotation of the earth, a frame mounted for rotation in azimuth in a first plane which is angularly inclined with respect to said first axis, said frame rotating about a second axis, a tracking head mounted on said frame for altitudinal rotation about a third axis which is disposed in said first plane and which extends perpendicular to the azimuthal position of the sun with respect to said second axis, azimuthal drive means comprising a universal joint having a driving member connected to said driving shaft for rotation about said first axis in an equitorial plane and a driven member connected to said frame for rotation in said first plane about said second axis and a centre of gyration located at the intersection of said first axis and said first plane, the driven member being arranged such that its variable angular velocity is synchronized with respect to that of the sun about said second axis to track the sun in azimuth, altitude drive means driving said tracking head about said third axis to track the sun in altitude as said tracking head is driven about said centre of gyration.

According to a further aspect of the present invention, the solar tracking device comprises a driving shaft having a first axis extending longitudinally thereof about which it is rotationally driven at a constant speed, said driving shaft being mounted with said first axis extending parallel to the axis of rotation of the earth, a frame mounted for rotation in azimuth in a first plane which is angularly inclined with respect to said first axis, said frame rotating about a second axis, a tracking head mounted on said frame for altitudinal rotation about a third axis which is disposed in said first plane and which extends perpendicular to the azimuthal position of the sun with respect to said second axis, altitude drive means comprising a driving element mounted on said driving shaft and extending radially therefrom for rotation about said first axis in an equitorial plane which coincides with said first plane at said first axis whereby its angle of inclination with respect to said first plane varies in accordance with the variation and altitude of the sun wich respect to said first plane and transmission means connecting said driving element to said tracking head to rotate said tracking head about said third axis to track the sun in altitude as said tracking head is driven about said first axis, azimuthal drive means driving said frame about said second axis at a variable angular velocity synchronized with respect to the velocity of the sun about said second axis to track the sun in azimuth.

According to a still further aspect of the present invention, a solar tracking device comprises a driving shaft having a first axis extending longitudinally thereof about which it is rotationally driven at a constant speed, said driving shaft being mounted with said first axis extending parallel to the axis of rotation of the earth, a frame mounted for rotation in azimuth in a first plane which is angularly inclined with respect to said first axis, said frame rotating about a second axis, a tracking head mounted on said frame for altitudinal rotation about a third axis which is disposed in said first plane and which extends perpendicular to the azimuthal position of the sun with respect to said second axis, azimuthal drive means and altitude drive means each driven by said driving shaft and having a common centre of gyration located in said first plane and on said first axis, said azimuthal drive means including a universal joint having; a driving member connected to said driving shaft for rotation about said first axis in an equitorial plane and a driven member connected to said frame for rotation in said first plane about said second axis and a centre of gyration coincident with said common centre of gyration, the driven member being arranged such that its variable angular velocity is synchronized with that of the sun about said second axis to track the sun in azimuth, said altitude drive means including a driving element mounted on said driving ahsft and extending radially therefrom for rotation about said first axis in said equitorial plane whereby its angle of inclination with respect to said first plane varies in accordance with the variation in altitude of the sun with respect to said first plane, and transmission means connecting said driving element to said tracking head to rotate said tracking head about said third axis to track the sun in altitude as said tracking head is driven about said centre of gyration.

The invention will be more clearly understood after reference to the following detailed specification read in conjunction with the drawings, wherein FIG. 1 of the drawings diagrammatically illustrates the apparent motion of the sun about a point on the surface of the earth;

FIG. 2 diagrammatically illustrates the position of the various planes and axes described in the remainder of the specification in relation to the surface of the earth;

FIG. 3 diagrammatically illustrates the azimuthal rotation of the sun about an axis parallel to the axis of rotation of the earth;

FIG. 4 is a side view of the azimuthal drive mechanism;

FIG. 5 diagrammatically illustrates the altitude drive mechanism;

FIG. 7 is a pictorial view of a solar tracking device according to an embodiment of the present invention;

FIG. 8 is a pictorial view of a portion of the altitude drive mechanism;

FIG. 9 is a side view of the tracking mechanism of FIG. 8;

FIG. 10 is a pictorial view of a torsion bar mechanism for applying torsion to the tracking head, and FIG. 11 is a detailed view of the torsion bar mechanism of FIG. 10.

Figure 1:
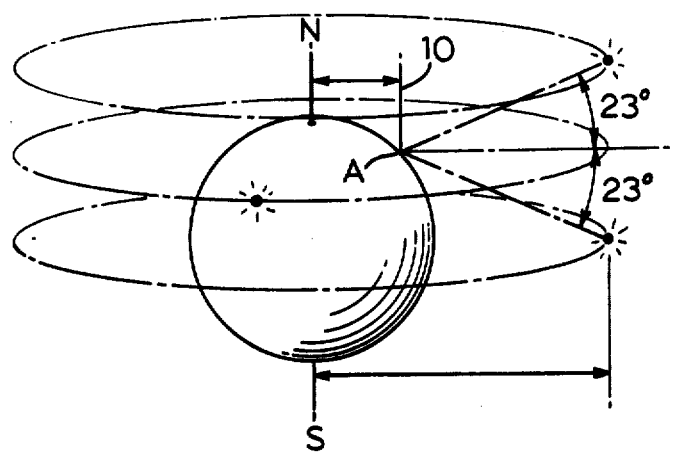

With reference to FIG. 1 of the drawings, it will be seen that the apparent rotation of the sun about the axis of rotation of the earth is in a series of equitorial planes which extend perpendicular to the axis of rotation of the earth. The apparent rotation about a point A on the surface of the earth spaced from the polar regions is also in a circular path about a first axis 10 parallel to the axis of rotation of the earth, the distance from the axis of rotation of the earth to the axis 10 in relation to the distance of the sun from the earth being so insignificant that the rotation about the point A can be taken to be circular.

Figure 2:
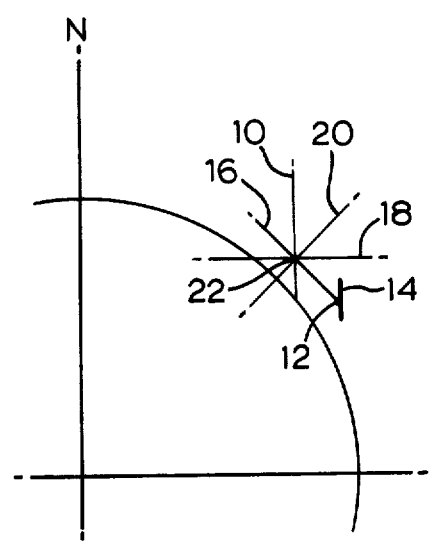

With reference to FIG. 2 of the drawings, it will be seen that the rotation of the sun about the first axis 10 will be in a series of equitorial planes extending parallel to the equitorial plane 18. However, for practical purposes it is necessary to rotate the tracking head 14 in a plane of azimuth 16 which is preferably substantially horizontal at the point on the surface of the earth where the apparatus is to be located. Rotation in the plane of azimuth is about a second axis 20. The tracking head 14 is rotatable about a third axis 12 which rotates about the axis 20 in the plane of azimuth 16 and which extends tangentially with respect to an arc generated from the axis 20. As shown in FIG. 2 of the drawings, the first axis 10 intersects the plane of azimuth 16 at a point 22 which forms a common centre of gyration through which the axis 20 and equitorial plane 18 extend.

Figure 3:
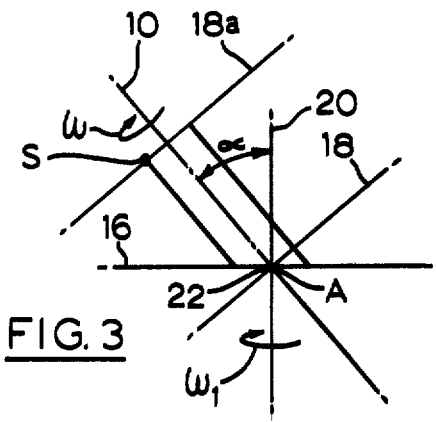

In FIG. 3 of the drawings, the azimuthal plane 16 has been rearranged so that it extends in a generally horizontal plane as it would be observed at the point A on the surface of the earth. The first axis 10 remains parallel to the axis of rotation of the earth and, as shown in FIG. 3, it is angularly inclined with respect to the second axis at an angle $\alpha$. As previously indicated, the sun S rotates in an equitorial plane parallel to the equitorial plane 18 and in FIG. 3 this plane is identified as plane 18a. The angular velocity of the sun about the first axis 10 is a constant one revolution per day, whereas the observed angular velocity at the point A about the second axis 20 is variable and may be identified as $\omega_1$.

If the sun S is considered to turn through an angle $\theta$ about the first axis 10 in the equitorial plane 18 at a velocity $\omega$, then the apparent velocity $\omega_1$ about the vertical axis 20 may be determined by the formula $$\omega/\omega_1 = (1 - \cos^2\theta \sin^2\alpha)/\cos\alpha \qquad \text{I}$$

wherein $\theta$ = angle of rotation of the sun in equitorial plane,
$\alpha$ = angle of inclination of axis of the earth with respect of vertical plane
$\omega$ = angular velocity of the sun in equitorial plane,
$\omega_1$ = observed angular velocity of the sun in horizontal plane.

As previously indicated, I have recognized that the relationship between the angular velocity of the driving shaft and that of the driven shaft of a common universal or Hookes joint is identical to the apparent angular velocity of the sun about an axis parallel to the axis of rotation of the earth and the observed velocity in a plane of azimuth which is angularly inclined with respect to the axis of rotation of the earth. It is well established that the ratio of angular velocity of the driving shaft with respect to the angular velocity of the driven shaft of a common universal joint may be determined by the formula $$\omega/\omega_1 = (1 - \cos^2\theta \sin^2\alpha)/\cos\alpha \qquad \text{II}$$

wherein $\theta$ = angle of rotation of driving shaft,
$\alpha$ = angle of inclination of driving shaft with respect to driven shaft,
$\omega$ = angular velocity of driving shaft, and
$\omega_1$ = angular velocity of driven shaft.

It will be apparent that formula I and formula II are identical and it follows that a Hookes universal joint may be used as the basis for an azimuthal drive mechanism in a solar tracking device.

AZIMUTHAL CONTROL

Figure 4:
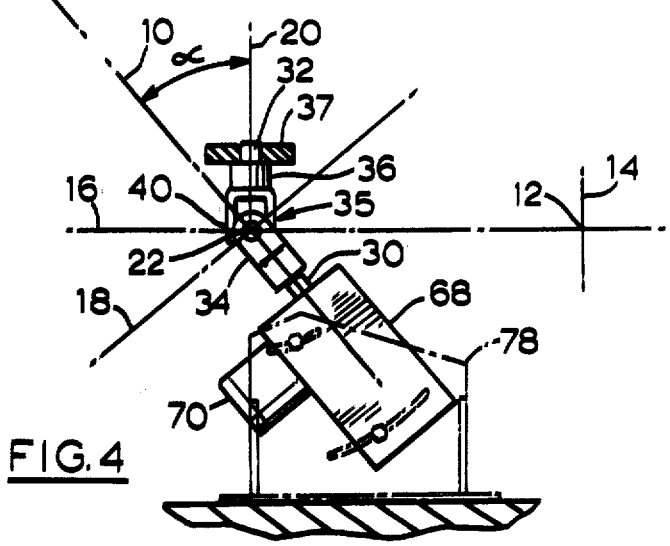

FIG. 4 of the drawings illustrates an azimuthal drive mechanism according to an embodiment of the present invention. In this mechanism, the main driving shaft 30 has its axis of rotation aligned with the first axis 10. A universal joint, generally designated by the reference 35, has a driving yoke 34 connected to the driving shaft 30 and a driven yoke connected by means of a shaft 32 to a frame 37 for rotation about the first axis 20. The universal joint has a cross member which has driving arms 34 which intersect driven arms 40 at the centre of gyration 22. Thus, the centre of gyration of the universal joint is located coincident with the centre of gyration located at the intersection of the first axis 10 and second axis 20 and the azimuthal plane 16 and equitorial plane 18 described with reference to FIG. 3 and also illustrated in FIG. 4. As will be seen hereinafter, the third axis 12 is carried by the frame 37 for rotation about the second axis 20 in an azimuthal plane which is at right angles thereto.

Having regard to the discussion of the rotation of the sun with reference to FIG. 3 and the location of the universal joint with reference to FIG. 4, it will be seen that if the driven arms 40 of the driven yoke 36 of the universal joint are oriented to extend in the plane of azimuth 16 perpendicular to the third axis 12 and the driving shaft 30 is rotatably driven at a speed of one revolution per day, the angular velocity of the third axis 12 about the second axis 20 may be synchronized with respect to the apparent angular velocity of the sun about the axis 20 so that the tracking head 14 may be aligned with the sun and caused to track the sun's rotation in azimuth.

ALTITUDE CONTROL

Figure 5:
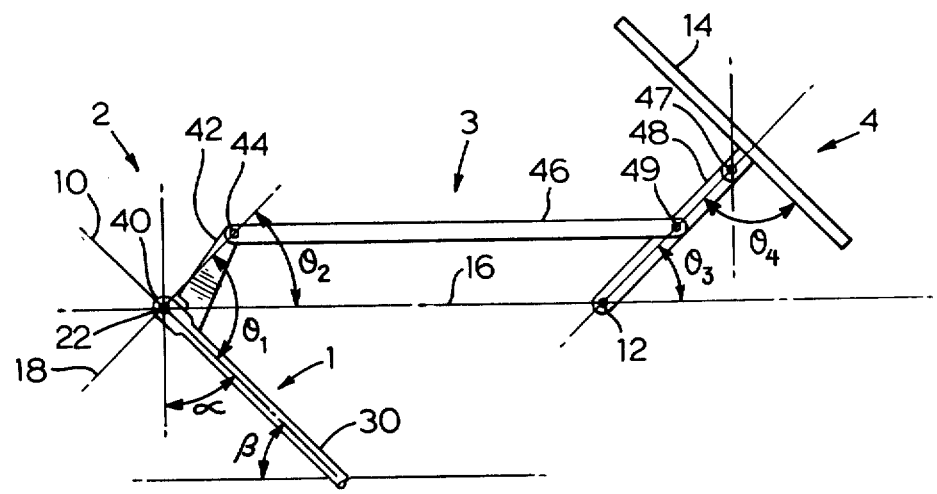

FIG. 5 of the drawings diagrammatically illustrates the principle on which the altitude control mechanism operates. In FIG. 5, like numerals have been applied to like axes, planes and parts previously described with reference to FIGS. 1 to 4 of the drawings. In FIG. 5, a driving arm 42 projects radially outwardly from the first axis 10 and has a pivot point 44 at the outer end thereof which is located in the equitorial plane 18 such that upon rotation of the driving shaft 30, the pivot point will remain in the equitorial plane 18 for all positions of the arm 42. It will be noted that, when viewed along axis 10, the arm 42 is radially aligned with the driven arm 40 of the universal joint 35 previously described with reference to FIG. 4. This fact is important in synchronizing the operation of the azimuthal and altitude drive mechanisms as will be described hereinafter.

It will be apparent that upon rotation of the driving shaft 30, the angle of inclination $\theta_2$ of the plane in which the arm 42 is located will vary from $+\alpha$ to $-\alpha$ and will be zero when the arm 42 has rotated through 90° about the first axis 10. This change in angular inclination of the arm 42 with respect to the azimuthal plane 16 occurs at a rate corresponding to the rate of change in altitude of the sun observed in the azimuthal plane. Consequently if this motion is translated to the detector head 14, the detector head 14 can be made to rotate about the axis 12 to track the sun in altitude. In the diagrammatic illustration in FIG. 5 of the drawings, the power is transmitted to the tracking head by a parallelogram linkage mechanism which includes a link arm 48 which is pivoted at one end on the third axis 12 and is connected at its other end to the tracking head 14 and an intermediate link arm 46. The intermediate link arm 46 is connected to the pivot pin 44 at one end and to a pivot pin 49 at the other end. The pivot pin 49 is located radially outwardly from the third axis 12 a distance equal to the radial displacement of the pivot pin 44 with respect to the first axis 10 and the link arm 46 has a length equal to the distance between the centre of gyration 22 and the third axis 12 measured in the azimuthal plane 16. Thus, it will be seen that $\theta_2$ may equal $\theta_3$ for all positions of the driving arm 42.

As shown in FIG. 1 of the drawings, the equitorial plane of the sun during the summer and winter is angularly displaced at an angle of 23° with respect to the equitorial plane at the equinox. Thus, it is only at the equinox condition that the equitorial plane extends through the centre of gyration 22. Nevertheless, it is possible to compensate for the variation in the position of the equitorial plane by adjusting the angle $\theta_4$, which is the angle of inclination of the tracking head 14 with respect to the support linkage 48. The angle of inclination $\theta_4$ may be adjusted by pivoting the head 14 about a pivot point 47. The change in equitorial plane occurs very gradually and consequently this adjustment may be made manually on a week by week or month by month basis or a small correcting drive mechanism may be provided in combination with a sensing head mounted on the detector head 14.

While FIG. 5 of the drawings serves to illustrate the principle upon which the altitude drive mechanism of the present invention operates, a mechanism constructed in accordance with FIG. 5 would tend to lock when it approaches the position 90° removed from that shown in FIG. 5 in which the pivot points 44 and 49 would be located in the plane of azimuth 16 and the detector 14 would extend perpendicularly with respect to the plane of azimuth 16. In addition, movement beyond this point would cause the detector head to tilt forward beyond the perpendicular position and it would eventually be directed downwardly in attempting to track the sun after sunset. Tracking of the sun after sunset is obviously unnecessary and consequently the altitude of the tracking head after sunset is immaterial. However, in order to permit the driving shaft 30 to rotate continually at a uniform rotational speed of one revolution per day it is necessary to continue the rotation of the tracking head in azimuth after sunset.

While various mechanisms may be employed to provide a lost motion in the link arm 46 of FIG. 5 to prevent the inversion of the parallelogram drive linkage, one particularly convenient mechanism is described with reference to FIGS. 7 to 9 of the drawings hereinafter.

Figure 6:
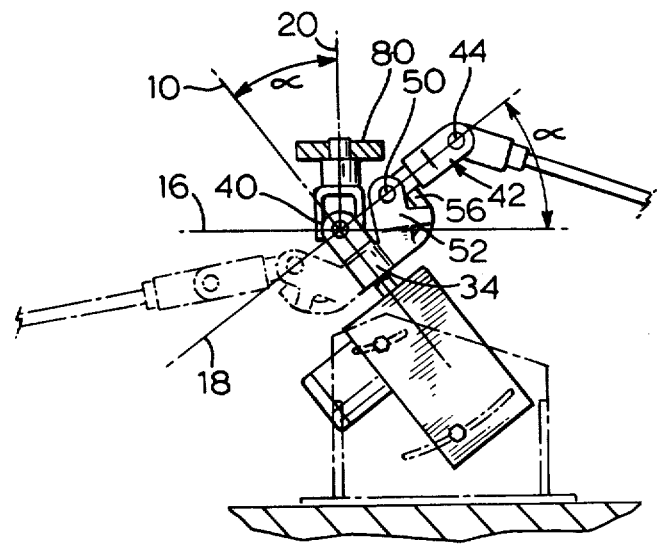
FIG. 6 is a side view of the mechanism which originates the altitude drive.

FIG. 6 of the drawings illustrates a practical form of the driving arm 42 incorporating a component which will provide the required lost motion. Again, in FIG. 6 of the drawings like numerals apply to like axes, planes and parts previously described with reference to FIGS. 1 to 5. The lost motion mechanism includes a bracket 52 which supports a shaft 50 upon which arm 54 is pivotally mounted. A stop 56 formed on the bracket 52 serves to prevent angular rotation of the shaft 54 below the equitorial plane 18 so that the pivot pin 44 located at the outer end of the shaft 54 cannot extend below the equitorial plane 18. The pivot pin 44 can, however, be displaced angularly above the equitorial plane and does so when the pivot point 50 passes below the plane of azimuth 16 in response to rotation of the driving shaft 34.

In FIG. 7 of the drawings, the reference numeral 60 refers generally to a solar tracking device constructed in accordance with a preferred embodiment of the present invention. The device includes a base member 62, a carriage 64 and a tracking head 14.

A drive unit 68 having a drive motor 70 is mounted in the base 62 by means of a pair of mounting studs 72 which extend through arcuate passages 74 formed in oppositely disposed side plates 78 of the base. The main driving shaft 30 is rotatably driven by the drive unit 68. The arcuate shaped slots 74 in the base serve to permit the drive unit 60 to be angularly adjusted with respect to the base 62 to align the first axis 10 of the driving shaft 30 with respect to the axis of rotation of the earth at any required location. The drive unit 68 includes a reduction gear mechanism for reducing the rotational speed of the motor 70 to drive the driving shaft 30 at a rotational speed of one revolution per day. The frame or carriage 64 has a cross bar 37 which is mounted on the driven shaft 32 of the universal joint as previously described with reference to FIG. 4 of the drawings so that the frame 64 may be rotated in azimuth to follow the azimuthal rotation of the sun about the second axis 20.

The cross bar 37 extends transversely between a pair of arms 82 (only one shown) which project upwardly from a collar 84. The collar 84 is spaced outwardly from the first axis 10 a distance sufficient to provide clearance for the altitude drive mechanism as it is rotatably driven about the first axis 10. The collar 84 is secured as by welding to box frame members 86 and 88 which project outwardly therefrom and are connected at their outer ends to a transverse box-shaped beam 90. Tracking wheels 92 are mounted on the frame 64 at the outer extremities thereof and are oriented to track along an arc generated from the axis 20. The tracking wheels 92 and the base 62 serve to support the carriage 64.

The tracking head 14 consists of a rectangular-shaped plate 94 which supports a sensor array 95. A pair of lugs 96 project rearwardly from the plate 94 and a pair of lugs 98 projecteforwardly from the beam 90. As shown in FIG. 11 of the drawings, the stub shaft 100 is secured to the lugs 96 and is pivotally mounted in a bush 99 carried by lugs 98. The stub shaft 100 has its axis of rotation aligned with the third axis 12 so that the detector head 14 may pivot about the axis 12 relative to the frame 64. For reasons described hereinafter, it is desirable to spring-load the detector head 14 so that it is urged to rotate about the axis 12 in the direction of the arrow T. This bias serves to maintain the arm 54 in the position bearing against the stop 56 during twelve hours of rotation of the altitude drive mechanism.

Biasing of the tracking head 14 in the direction of the arrow T is obtained by means of a torsion bar mechanism illustrated in FIGS. 10 and 11 of the drawings. A pair of torsion bars 102 each have a square-shaped end 104 anchored in a square-shaped passage formed in the shafts 100. The opposite ends 106 of the shafts are also square and are mounted in a square-shaped passage 108 in a lug 110 which projects outwardly from the transverse beam member 90. Torque is applied to the torque bars 102 before they are mounted so that in use the torsion bars 102 apply a torque in the direction of the arrow T about the axis 12.

As previously indicated, the altitude control mechanism illustrated in FIG. 6 of the drawings has practical restrictions which would limit its application. The practical form of altitude control mechanism illustrated in FIGS. 7, 8 and 9 of the drawings does, however, function in exactly the same manner as that previously described in FIG. 6 of the drawings during 180° of azimuthal rotation, plus or minus 90° from the position shown in FIG. 6.

With reference to FIGS. 6 and 9 of the drawings, it will be seen that the simple parallelogram linkage mechanism of FIG. 6 has been replaced by a linkage mechanism which incorporates two parallelograms interconnected by a bell crank. This mechanism has been employed so that the arm 54 will pull the altitude control linkage when moving the detector head from the upright position which it will assume at sunrise and sunset and its rearwardly inclined position which it will assume at noon. This provides for the most efficient operation of the linkage mechanism when translated to the tracking head through the second parallelogram linkage.

The altitude control mechanism will now be described in detail with reference to FIGS. 7, 8 and 9 of the drawings. As shown in FIGS. 7 and 8 of the drawings, a plate 120 is supported in a position below the frame 64 by arms 122 and 124 which are connected to beams 88 and 90 respectively. As shown in FIG. 7 of the drawings, a pair of lugs 126 are mounted on the plate 120 and project upwardly therefrom. A shaft 128 is mounted for rotation about the axis 129 on lugs 126. A yoke 130 is located at one end of the shaft 128 and a shaft 132 is pivotally mounted on the yoke 130 for rotation in the direction of the arrows 136. A lever arm 134 projects radially outwardly from the shaft 132 so as to be rotatable in the direction of the arrows 138 about the axis 129. A lever arm 140 projects radially from the shaft 128 and is rotatable about the axis 129 in the direction of the arrows 142. Lever arms 134 and 140 are connected to one another as previously described to provide a bell crank lever mechanism. The lever arm 134 has a yoke 146 at one end thereof connected to link arm 144 which has a shaft 148 at the other end thereof connected to shaft 54 along axis 44. Thus, it will be seen that the bell crank mechanism and link arm 144 cooperate to provide a first parallelogram having axes 22, 44, 135 and 129.

the lever arm 140 is pivotally connected along axis 141 to link arm 150 which is pivotably connected along axis 151 to arm 152 which is in turn pivotably connected to the frame along axis 12. Thus, the second parallelogram linkage has arms pivotably connected at axes 129, 141, 151 and 12. Brackets 154 project rearwardly from the beam member 90 to support the pivot pin which provides the connection with the arm 152 on axis 12.

As previously indicated, it is necessary to make periodic adjustments of the angular position of the tracking head about the axis 12 as the equitorial plane of rotation of the sun changes. An arcuate-shaped bracket 156 has one end pivotally mounted on a pivot pin 158 carried by lugs 160 which project rearwardly from the plate 94. The arcuate-shaped bracket 156 has an arcuate-shaped slot 162 extending longitudinally thereof in an arc generated about the third axis 12. A releasable mounting bolt assembly 164 releasably secures the arcuate-shaped bracket 156 with respect to the arm 152. By releasing the mounting bolt assembly 164, the angle of inclination of the plane of the collector plate 194 may be adjusted relative to the altitude control mechanism.

INITIAL ALIGNMENT OF APPARATUS

As previously indicated, in order to synchronize the azimuthal rotation of the carriage with respect to the sun, it is necessary to align the driven arms 40 of the universal joint with the position of the sun in azimuth and to ensure that the third axis 12 is located in the azimuthal plane and extends at right angles to the axis extending through the driven arms of the universal joint. Similarly the altitude drive arm which projects radially from the first axis 10 must be aligned with the driven arms 44 of the universal joint and located in the equitorial plane 18. In the position shown in FIG. 9 of the drawings, the azimuthal and altitude drive mechanisms are arranged in the position which they are required to assume at noon and the angular position of the tracking head is adjusted so as to extend perpendicular to the rays of the sun by adjustment of the position of the plate 94 about the third axis 12 by means of the adjustment screw 164 and arcuate slot 162 previously described. At the equinox, the plate 94 will extend in a plane parallel to the first axis while under summer conditions, the angle of inclination of the plate will increase progressively in an anticlockwise direction about the axis 12 up to an angle of 23° and in winter, the angle of inclination of the plate will be decreased progressively in a clockwise direction up to 23° from the position shown in FIG. 9.

METHOD OF OPERATION

Having set the position of the solar tracking mechanism as described above, it is merely necessary to start the driven motor 70 to rotate the driving shaft 30 about the first axis 10 and the azimuthal and altitude drive mechanisms will cause the tracking head to follow the sun as it rotates about the axis of the earth. During 24 hours of rotation, the azimuthal drive mechanism will maintain the third axis 12 in a plane normal to a line extending from the sun to the centre of gyration 22. During 12 hours, 6 hours before noon and 6 hours after noon, the altitude drive mechanism will maintain the tracking head in the plane extending perpendicular to the sun's rays. After the altitude control mechanism rotates past the 6 p.m. position, the arm 54 will begin to pivot about pivot pin 50 so that the axis 54 will rise above the equitorial plane 18. In this position, the tracking head will lean forward as shown in FIG. 9 of the drawings. A stop is, however, provided for limiting the forward movement of the head so that it cannot tilt beyond the substantially vertical position shown to the left in FIG. 9. Because this stop is provided, it is necessary to provide for the shortening of one of the arms of the parallelogram. This is achieved by permitting the arm 54 to pivot upwardly about the pivot point 56 to the position shown in chain lines to the left of FIG. 9 so as to effectively shorten the distance between the pivot point 44a and the centre of gyration 22.

In the embodiment of the invention illustrated in FIGS. 7, 8 and 9, it will be seen that the first parallelogram of the altitude drive mechanism is oriented in a generally vertical plane in the positions shown in FIGS. 7 and 9. When the frame is rotated to a position 90° removed from that shown in FIG. 9, the first parallelogram will be slightly angularly inclined with respect to the vertical plane. This may introduce a minor error in altitude adjustment of the tracking head. However, the error will be so minor as to be insignificant.

Various modifications of the present invention will be apparent to those skilled in the art without departing from the scope thereof. For example, the azimuthal drive mechanism may be used to advantage in combination with an alternative form of altitude drive mechanism and vice versa. In addition, an alternative form of linkage mechanism for translating the altitude drive to the tracking head may be provided while retaining the essential characteristics of the mechanisms illustrated in FIGS. 5 and 9 of the drawings.

In a further modification, the altitude adjustment in the mechanism provided by the arcuate slot 162 and clamping bolt assemblt 164 may be replaced by a powered drive mechanism controlled by a sensing head mounted on the detector head. The sensing head may serve to detect minor errors in the altitude position of the head at a pre-set time each day or week, the detector head providing a signal which is directed to the drive mechanism to cause the plate 94 to pivot about the axis 12 to correct the angle of inclination of the detector head.

These and other modifications of the present invention will be apparent to those skilled in the art.

What I claim as my invention is:
1. A solar tracking device comprising,
   (a) a base member,
   (b) a main driving shaft having a longitudinal first axis, said main drive shaft being mounted on said base for rotation about said first axis and being supported with said first axis extending parallel to the axis of rotation of the earth, said main drive shaft having a power output end,
   (c) drive means connected to said main drive shaft for rotatably driving it about said longitudinal axis at one revolution per day,
   (d) a carriage supported for azimuthal rotation, in a first plane which is angularly inclined with respect to said first axis, about a second axis which extends perpendicular to said first plane,
   (e) a tracking head mounted on said carriage for altitudinal rotation about a third axis which is disposed in said first plane and spaced radially outwardly from said second axis and extends tangential to an arc generated from said second axis,
   (f) azimuthal drive means comprising,
      (i) a universal joint having a centre of gyration, a driving yoke, a driven yoke and a cross member, said cross member having driving arms connected to the driving yoke and driven arms connected to the driven yoke, the driving arms and driven arms having axes extending perpendicular to one another and intersecting said centre of gyration, the axis of the driven arms being oriented to extend perpendicular to said third axis, said driven yoke being connected to said main drive shaft and said driven yoke being connected to said carriage with its axis of rotation aligned with said second axis, such that rotation of said main drive shaft drives said carriage about said second axis at an angular velocity which varies in accordance with the azimuthal velocity of the sun,
   (g) altitude drive means comprising,
      (i) an altitude drive arm projecting radially from said main drive shaft and having a first point thereon which describes an arc in a second plane which is perpendicular to said longitudinal axis of said main drive shaft and which intersects the longitudinal axis at a second point which is at the centre of gyration of said universal joint, said first point being oriented so that a line extending between said first point and said second point is parallel to the rays of the sun at the equinox,
      (ii) linkage means extending between said first point on said altitude drive arm and said tracking head to maintain said tracking head at a fixed angle with respect to said line,
      (iii) means for adjusting the angular position of said tracking head with respect to said linkage means to alter said fixed angle in accordance with the declination of the sun.

2. A solar tracking device comprising,
   (a) a driving shaft having a first axis extending longitudinally thereof about which it is rotationally driven at a constant speed, said driving shaft being mounted with said first axis extending parallel to the axis of rotation of the earth,
   (b) a frame mounted for rotation in azimuth in a first plane which is angularly inclined with respect to said first axis, said frame rotating about a second axis,
   (c) a tracking head mounted on said frame for altitudinal rotation about a third axis which is disposed in said first plane and which extends perpendicular to the azimuthal position of the sun with respect to said second axis, (d) azimuthal drive means and altitude drive means each driven by said driving shaft and having a common centre of gyration located in said first plane and on said first axis, (e) said azimuthal drive means including a universal joint having; a driving member connected to said driving shaft for rotation about said first axis in an equitorial plane and a driven member connected to said frame for rotation in said first plane about said second axis and a centre of gyration coincident with said common centre of gyration, the driven member being arranged such that its variable angular velocity is synchronized with that of the sun about said second axis to track the sun in azimuth.

(f) said altitude drive means including a driving element mounted on said driving shaft and extending radially therefrom for rotation about said first axis in said equitorial plane whereby its angle of inclination with respect to said first plane varies in accordance with the variation in altitude of the sun with respect to said first plane, and transmission means connecting said driving element to said tracking head to rotate said tracking head about said third axis to track the sun in altitude as said tracking head is driven about said centre of gyration.

3. A solar tracking device comprising, (a) a driving shaft having a first axis extending longitudinally thereof about which it is rotationally driven at a constant speed, said driving shaft being mounted with said first axis extending parallel to the axis of rotation of the earth, (b) a frame mounted for rotation in azimuth in a first plane which is angularly inclined with respect to said first axis, said frame rotating about a second axis, (c) a tracking head mounted on said frame for altitudinal rotation about a third axis which is disposed in said first plane and which extends perpendicular to the azimuthal position of the sun with respect to said second axis, (d) azimuthal drive means comprising a universal joint having a driving member connected to said driving shaft for rotation about said first axis in an equitorial plane and a driven member connected to said frame for rotation in said first plane about said second axis and a centre of gyration located at the intersection of said first axis and said first plane, the driven member being arranged such that its variable angular velocity is synchronized with respect to that of the sun about said second axis to track the sun in azimuth, (e) altitude drive means driving said tracking head about said third axis to track the sun in altitude as said tracking head is driven about said centre of gyration.

4. A solar tracking device comprising, (a) a driving shaft having a first axis extending longitudinally thereof about which it is rotationally driven at a constant speed, said driving shaft being mounted with said first axis extending parallel to the axis of rotation of the earth, (b) a frame mounted for rotation in azimuth in a first plane which is angularly inclined with respect to said first axis, said frame rotating about a second axis, (c) a tracking head mounted on said frame for altitudinal rotation about a third axis which is disposed in said first plane and which extends perpendicular to the azimuthal position of the sun with respect to said second axis, (d) altitude drive means comprising a driving element mounted on said driving shaft and extending radially therefrom for rotation about said first axis in an equitorial plane which coincides with said first plane at said first axis whereby its angle of inclination with respect to said first plane varies in accordance with the variation and altitude of the sun with respect to said first plane and transmission means connecting said driving element to said tracking head to rotate said tracking head about said third axis to track the sun in altitude as said tracking head is driven about said first axis, (e) azimuthal drive means driving said frame about said first axis at a variable angular velocity synchronized with respect to the velocity of the sun about said second axis to track the sun in azimuth.

* * * * *